(12) United States Patent
Puleri et al.

(10) Patent No.: US 10,771,348 B2
(45) Date of Patent: Sep. 8, 2020

(54) INFERRING COMPONENT PARAMETERS FOR COMPONENTS IN A NETWORK

(71) Applicant: Telefonaktiebolaget LM Ericsson (publ), Stockholm (SE)

(72) Inventors: Marzio Puleri, Pisa (IT); Teresa Pepe, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 15/526,242

(22) PCT Filed: Nov. 19, 2014

(86) PCT No.: PCT/EP2014/074997
§ 371 (c)(1),
(2) Date: May 11, 2017

(87) PCT Pub. No.: WO2016/078703
PCT Pub. Date: May 26, 2016

(65) Prior Publication Data
US 2017/0317890 A1    Nov. 2, 2017

(51) Int. Cl.
*H04L 12/24*    (2006.01)
*H04L 12/26*    (2006.01)

(52) U.S. Cl.
CPC ............ *H04L 41/147* (2013.01); *H04L 41/14* (2013.01); *H04L 43/08* (2013.01)

(58) Field of Classification Search
USPC ................................................. 709/220–224
See application file for complete search history.

(56) References Cited

U.S. PATENT DOCUMENTS 6,078,919 A *   6/2000   Ginzburg ................. H04L 47/10
6,249,749 B1 *  6/2001   Tran ..................... G10L 21/0208
                                                          702/66

(Continued)

FOREIGN PATENT DOCUMENTS

WO    WO 2015 161872    10/2015

OTHER PUBLICATIONS

Characteristics of TCP Connection Arrivals by Anja Feldmann—Dec. 3, 1998.

(Continued)

*Primary Examiner* — Younes Naji
*Assistant Examiner* — Da T Ton
(74) *Attorney, Agent, or Firm* — Sage Patent Group

(57) ABSTRACT

A method for inferring component parameter values for components in a network is disclosed. The components comprise at least one of network nodes or network links and the method comprises identifying a plurality of paths through the network (100), measuring values of a path parameter for identified paths (410), generating a set of constraints by expressing individual measured path parameter values as a function of component parameter values of the components in the path associated with the measured path parameter value (420*a*), and generating an estimate of the component parameter values by solving an optimisation problem defined by the generated constraints (420*b*). The method further comprises, for individual components in the identified paths, matching the generated estimates of the component parameter value to a statistical distribution describing a behaviour of the component parameter (430*a*), identifying a ratio of central moments of the statistical distribution that demonstrates a sensitivity to noise below a threshold value (430*b*), and calculating an inferred value of (Continued)

the component parameter from the identified ratio of central moments (430*c*).

18 Claims, 10 Drawing Sheets

(56) References Cited

U.S. PATENT DOCUMENTS

| | | | | |
|---|---|---|---|---|
| 10,298,464 | B2 * | 5/2019 | Zhang | H04L 47/127 |
| 2004/0100936 | A1 * | 5/2004 | Liu | H04W 74/085 |
| | | | | 370/345 |
| 2005/0240386 | A1 | 10/2005 | Carballo et al. | |
| 2012/0163191 | A1 * | 6/2012 | Tokimizu | H04L 41/0677 |
| | | | | 370/242 |
| 2013/0290223 | A1 | 10/2013 | Chapelle et al. | |
| 2014/0188432 | A1 * | 7/2014 | Aljadeff | G01S 5/02 |
| | | | | 702/182 |

OTHER PUBLICATIONS

Characterizing Network Processing Delay by Ramaswamy Ramaswamy et al.; IEEE Communications Society Globecome2004—IEEE 2004.

Fuzzy Systems As Universal Approximators by Bart Kosko—IEEE 1994.

Internet QOS Measurement and Traffic Modelling by Haitham Cruickshank; ATS Conference, Stuttgart—Jan. 20-21, 2003.

Internet Tomography by Mark Coates et al.—Jan. 2002.

Network Tomography: Estimating Source-Destination Traffic Intensities From Link Data by Y. Vardi; Journal of the American Statistical Association, vol. 91, Issue 433—Mar. 1996.

Online Network Performance Degradation Localization Using Probabilistic Inference and Change Detection by Andreas Johnsson et al.; Research Area Packet Technologies, Ericsson Research, Kista, Sweden—IEEE 2014.

International Search Report for International application No. PCT/EP2014/074997—dated Aug. 6, 2015.

Topological Constraints on Identifying Additive Link Metrics Via End-To-End Paths Measurements by Liang Ma et al.—Sep. 20, 2012.

* cited by examiner

INFERRING COMPONENT PARAMETERS FOR COMPONENTS IN A NETWORK

PRIORITY

This nonprovisional application is a U.S. National Stage Filing under 35 U.S.C. § 371 of International Patent Application Serial No. PCT/EP2014/074997 filed Nov. 19, 2014, and entitled "Inferring Component Parameters For Components In A Network."

TECHNICAL FIELD

The present invention relates to a method and network element for inferring component parameters for components in a network, which components may comprise network nodes or network links. The present invention also relates to a computer program product configured, when run on a computer, to carry out a method for inferring component parameters for components in a network.

BACKGROUND

Performance evaluation and diagnosis is an important aspect of network management for all kinds of network. It is desirable to be able to monitor and asses parameters indicative of network performance for all components of a network in order to evaluate overall network performance, identify potential for performance improvement and diagnose problems. Particularly in the case of large scale communication networks, which may be substantially unregulated and highly heterogeneous, a single network operator or provider may not have control over all segments of a network that impact upon relevant performance data for that operator or provider. Certain segments of the network may therefore be unobservable, as the cooperation of network elements within those segments cannot be obtained.

Network Tomography has emerged as a promising technique enabling unobservable network performance parameters to be inferred without requiring cooperation of internal network components. Unobservable parameters are inferred solely on the basis of end-to-end (E2E) measurements conducted using edge nodes. Referring to the network 2 illustrated in FIG. 1, a series of probing paths is defined through the network, the probing paths originating and terminating with edge nodes 4 and traversing internal nodes 6. E2E measurements on data packets transmitted on the probing paths may be conducted with the cooperation of edge nodes 4. With an appropriately chosen set of probing paths, these E2E measurements may be used to infer node parameters for the internal network nodes 6. The task of finding the probing paths required to enable inferring of parameters for internal network nodes is referred to as the identifiability problem. The solution to this problem is a set of probing paths that provide full monitoring coverage of the network, that is that enable performance parameters for all internal network nodes to be inferred.

In practice, a majority of real networks are unidentifiable; structural limitations of their network topologies mean the identifiability problem cannot be solved. In such cases it is not possible to define a complete set of independent probing paths in the network which provides full monitoring coverage of the network, allowing a unique set of values for the parameters of interest to be inferred. Network Tomography techniques are therefore inapplicable to a majority of real networks. Considering an example network, identification methods can define a set of independent paths which is given by the cyclomatic complexity of the network graph:

$$n\text{Paths} = \text{Edges} - \text{Nodes} + p\_\text{components} + 1$$

where nPaths represents the number of independent paths, Edges and Nodes represent the number of edges (links) and nodes of the network graph, and p_components represents the number of monitoring points, that is the edge nodes at which probing paths may originate or terminate. The unknown parameter values are equal in number to the Edges. In order to achieve full monitoring coverage of the network, the number of monitoring points must therefore be equal to Nodes−1. Such a large number of monitoring points is clearly impractical, as monitoring probes would be required on practically every node, whereas the purpose of Network Tomography is to obtain a picture of internal network functioning from the network periphery, i.e. having access to only a subset of nodes at the edge of the network.

In order to address the identifiability problem for complex real networks, additional constraints may be manually identified and applied to a network, so enabling full monitoring coverage with a reduced set of probing paths. However, a suitable set of additional constraints can be only achieved in certain specific cases, for example where the parameters to be inferred represent on/off processes such as loss measurements, where a packet can be lost or not lost. In all other cases, a unique solution cannot be found for the internal parameters. In a further complication for situations where additional constraints can be applied to a network, such additional constraints can only be defined according to the available monitoring points and so, depending on the network topology, they may not be sufficient to achieve full monitoring coverage of the network.

SUMMARY

It is an aim of the present invention to provide a method, apparatus and computer readable medium which at least partially address one or more of the challenges discussed above.

According to a first aspect of the present invention, there is provided a method for inferring component parameters for components in a network, wherein the components comprise at least one of network nodes or network links. The method comprises identifying a plurality of paths through the network, measuring values of a path parameter for identified paths, generating a set of constraints by expressing individual measured path parameter values as a function of component parameters of the components in the path associated with the measured path parameter value, and generating an estimate of the component parameters by solving an optimisation problem defined by the generated constraints. The method further comprises, for individual components in the identified paths, matching the generated estimates of the component parameter value to a statistical distribution describing a behaviour of the component parameter, identifying a ratio of central moments of the statistical distribution that demonstrates a sensitivity to noise below a threshold value, and calculating an inferred value of the component parameter from the identified ratio of central moments.

According to some examples of the invention, measuring values of a path parameter for identified paths, generating a set of constraints and generating an estimate of the component parameter values may comprise a trial iteration; and the method may further comprise repeating the trial iteration until an exit condition is satisfied before conducting subsequent method steps. According to some examples, the exit criterion may comprise a number of trial iterations corresponding to a predetermined minimum estimation accuracy. In one example, a variance of the inferred value from the identified ratio of central moments may be calculated as a function of the number of iterations conducted. A maximum variance may then be selected, representing a minimum level of accuracy in the inferred value. A number of trial iterations corresponding to the selected maximum variance may be then be identified.

According to some examples of the invention, identifying a plurality of paths through the network may comprise running a network tomography identifiability problem solving function. According to further examples, measuring values of a path parameter may comprise receiving a measurement conducted on a probing packet transmitted over the path.

According to some examples, expressing a measured path parameter value as a function of component parameter values of the components in the path associated with the measured path parameter value may comprise expressing the measured path parameter value as a function of the summation of component parameter values of the components in the path associated with the measured path parameter value. The component parameter to be inferred may thus comprise an additive parameter.

According to some examples, the component parameter may comprise a measure of component congestion. In some examples, the components may comprise network nodes and the component parameter may comprise node queuing time. According to some examples, the path parameter may comprise inter-arrival time.

According to some examples, solving an optimisation problem defined by the generated constraints may comprise minimising a cost function according to the generated constraints. In some examples, initial values for the node parameters in the optimisation problem may be selected randomly. In some examples, the optimisation problem may comprise a least squares minimisation.

According to some examples, calculating an inferred value of the component parameter may comprise calculating a mean of the matched statistical distribution from the identified ratio of central moments.

According to some examples, the statistical distribution may comprise an inverse Gaussian distribution, and identifying a ratio of central moments of the statistical distribution that demonstrates a sensitivity to noise below a threshold value may comprises identifying a ratio of variance over skewness or variance over kurtosis.

According to some examples, the method may further comprise estimating an error in the inferred values of the component parameter and adjusting the inferred values on the basis of the estimated error.

According to some examples, the error may be a function of at least one of network topology, paths identified, and/or component parameter interaction.

According to some examples, estimating an error in the inferred values of the component parameter may comprise training a function approximator using simulated inferred values of the component parameter, and adjusting the inferred values on the basis of the estimated error may comprise applying the trained function approximator to the inferred values.

According to some examples, training a function approximator using simulated inferred values of the component parameter may comprise selecting training values for the component parameter for components in the network, simulating measured path parameter values on the basis of the selected training values, inferring values for the component parameter for components in the network on the basis of the simulated measured path parameter values, and inputting the inferred values and the training values to a learning phase of a function approximator. In some examples, the function approximator may be a fuzzy universal approximator or a neural network.

According to some examples, inferring values for the component parameter may comprise repeating the steps of the method according to the first aspect of the present invention using the simulated measured path parameter values in place of measured path parameter values.

According to some examples, estimating an error may further comprise repeating the steps of training a function approximator until the estimated error converges to within a threshold margin.

According to some examples, estimating an error may further comprise, once the error has converged to within a threshold margin, checking that the error is below a threshold level and, if the converged error is not below the threshold level, identifying a new plurality of paths through the network and repeating the steps of training a function approximator on the basis of the new identified plurality of paths.

According to another aspect of the present invention, there is provided a computer program product configured, when run on a computer, to carry out a method according to the first aspect of the present invention.

According to another aspect of the present invention, there is provided a network element for inferring component parameters for components in a network wherein the components comprise at least one of network nodes or network links, the network element comprising a processor and a memory. The memory contains instructions executable by the processor such that the processor is operable to identify a plurality of paths through the network, measure values of a path parameter for identified paths, generate a set of constraints by expressing individual measured path parameter values as a function of component parameter values of the components in the path associated with the measured path parameter value, and generate an estimate of the component parameter values by solving an optimisation problem defined by the generated constraints. The processor is further operable, for individual components in the identified paths, to match the generated estimates of the component parameter value to a statistical distribution describing a behaviour of the component parameter, identify a ratio of central moments of the statistical distribution that demonstrates a sensitivity to noise below a threshold value, and calculate an inferred value of the component parameter from the identified ratio of central moments.

According to some examples of the invention, measuring values of a path parameter for identified paths, generating a set of constraints and generating an estimate of the component parameter values may comprise a trial iteration; and the network element may be further operable to repeat the trial iteration until an exit condition is satisfied before conducting subsequent steps. According to some examples, the exit criterion may comprise a number of trial iterations corresponding to a predetermined minimum estimation accuracy. In one example, a variance of the inferred value from the identified ratio of central moments may be calculated as a function of the number of iterations conducted. A maximum variance may then be selected, representing a minimum level of accuracy in the inferred value. A number of trial iterations corresponding to the selected maximum variance may be then be identified.

According to some examples, the network element may be further operative to identify a plurality of paths through the network by running a network tomography identifiability problem solving function.

According to some examples, the network element may be further operative to measure values of a path parameter value by receiving a measurement conducted on a probing packet transmitted over the path.

According to some examples, the network element may be further operative to express a measured path parameter value as a function of component parameter values of the components in the path associated with the measured path parameter value by expressing the measured path parameter value as a function of the summation of component parameter values of the components in the path associated with the measured path parameter value.

According to some examples, the component parameter may comprise a measure of component congestion.

According to some examples, the components may comprise network nodes and the component parameter may comprise node queuing time.

According to some examples, the path parameter may comprise inter-arrival time.

According to some examples, the network element may be further operative to solve an optimisation problem defined by the generated constraints by minimising a cost function according to the generated constraints.

According to some examples, the optimisation problem may comprise a least squares minimisation.

According to some examples, the network element may be further operative to calculate an inferred value of the component parameter by calculating a mean of the matched statistical distribution from the identified ratio of central moments.

According to some examples, the statistical distribution may comprise an inverse Gaussian distribution, and the network element may be further operative to identify a ratio of central moments of the statistical distribution that demonstrates a sensitivity to noise below a threshold value by identifying a ratio of variance over skewness or variance over kurtosis.

According to some examples, the network element may be further operative to estimate an error in the inferred values of the component parameter and adjust the inferred values on the basis of the estimated error.

According to some examples, the error may be a function of at least one of network topology, paths identified and/or component parameter interaction.

According to some examples, the network element may be further operative to estimate an error in the inferred values of the component parameter by training a function approximator using simulated inferred values of the component parameter, and the network element may be further operative to adjust the inferred values on the basis of the estimated error by applying the trained function approximator to the inferred values.

According to some examples, the network element may be further operative to train a function approximator using simulated inferred values of the component parameter by selecting training values for the component parameter for components in the network, simulating measured path parameter values on the basis of the selected training values, inferring values for the component parameter for components in the network on the basis of the simulated measured path parameter values, and inputting the inferred values and the training values to a learning phase of a function approximator.

According to some examples, the network element may be further operative to infer values for the component parameter by repeating the steps of the first aspect of the present invention using the simulated measured path parameter values in place of measured path parameter values.

According to some examples, the network element may be further operative to estimate an error by repeating the steps of training a function approximator until the estimated error converges to within a threshold margin.

According to some examples, the network element may be further operative to estimate an error by checking that the error is below a threshold level once the error has converged to within a threshold margin, and, if the converged error is not below the threshold level, identifying a new plurality of paths through the network and repeating the steps of training a function approximator on the basis of the new identified plurality of paths.

According to another aspect of the present invention, there is provided a network element for inferring component parameters for components in a network wherein the components comprise at least one of network nodes or network links, the network element comprises a network identifying unit configured to identify a plurality of paths through the network and an estimating unit comprising a path unit configured to measure values of a path parameter for paths identified by the network identifying unit, and an optimisation unit configured to generate a set of constraints by expressing individual measured path parameter values as a function of component parameter values of the components in the path associated with the measured path parameter value, and to generate an estimate of the component parameter values by solving an optimisation problem defined by the generated constraints. The network element further comprises an inferring unit configured, for individual components in the identified paths, to match the generated estimates of the component parameter value to a statistical distribution describing a behaviour of the component parameter, identify a ratio of central moments of the statistical distribution that demonstrates a sensitivity to noise below a threshold value, and calculate an inferred value of the component parameter from the identified ratio of central moments.

According to some examples of the invention, the functions of the path unit and optimisation unit may comprise a trial iteration, and the estimating unit may be configured to repeat the trial iteration until an exit condition is satisfied before the inferring unit carries out its functions. According to some examples, the exit criterion may comprise a number of trial iterations corresponding to a predetermined minimum estimation accuracy. In one example, a variance of the inferred value from the identified ratio of central moments may be calculated as a function of the number of iterations conducted. A maximum variance may then be selected, representing a minimum level of accuracy in the inferred value. A number of trial iterations corresponding to the selected maximum variance may be then be identified.

According to some examples, the network identifying unit may be further configured to identify a plurality of paths through the network by running a network tomography identifiability problem solving function.

According to some examples, the path unit may be further configured to measure values of a path parameter by receiving a measurement conducted on a probing packet transmitted over the path.

According to some examples, the optimisation unit may be further configured to express a measured path parameter value as a function of component parameter values of the components in the path associated with the measured path parameter value by expressing the measured path parameter value as a function of the summation of component parameter values of the components in the path associated with the measured path parameter value.

According to some examples, the component parameter may comprise a measure of node congestion. According to some examples, the components may comprise network nodes and the component parameter may comprise node queuing time.

According to some examples, the path parameter may comprise inter-arrival time.

According to some examples, the optimisation unit may be further configured to solve an optimisation problem defined by the generated constraints by minimising a cost function according to the generated constraints. According to some examples, the optimisation problem may comprise a least squares minimisation.

According to some examples, the inferring unit may be further configured to calculate an inferred value of the component parameter by calculating a mean of the matched statistical distribution from the identified ratio of central moments.

According to some examples, the statistical distribution comprises an inverse Gaussian distribution, and the inferring unit may be further configured to identify a ratio of central moments of the statistical distribution that demonstrates a sensitivity to noise below a threshold value by identifying a ratio of variance over skewness or variance over kurtosis.

According to some examples, the network element may further comprise an error correction unit, the error correction unit comprising an error estimating unit configured to estimate an error in the inferred values of the component parameter, and an error adjusting unit configured to adjust the inferred values on the basis of the estimated error.

According to some examples, the error may be a function of at least one of network topology, paths identified and/or component parameter interaction.

According to some examples, the error estimating unit may be further configured to estimate an error in the inferred values of the component parameter by training a function approximator using simulated inferred values of the component parameter, and the error adjusting unit may be further configured to adjust the inferred values on the basis of the estimated error by applying the trained function approximator to the inferred values.

According to some examples, the error estimating unit may be further configured to train a function approximator using simulated inferred values of the component parameter by selecting training values for the component parameter for components in the network, simulating measured path parameter values on the basis of the selected training values, inferring values for the component parameter for components in the network on the basis of the simulated measured path parameter values, and inputting the inferred values and the training values to a learning phase of a function approximator.

According to some examples, the error estimating unit may be further configured to infer values for the component parameter by forwarding the simulated measured path parameters to the inferring unit for use in place of measured path parameter values.

According to some examples, the error estimating unit may be further configured to estimate an error by repeating the steps of training a function approximator until the estimated error converges to within a threshold margin.

According to some examples, the error estimating unit may be further configured to estimate an error by checking that the error is below a threshold level once the error has converged to within a threshold margin, and, if the converged error is not below the threshold level, identifying a new plurality of paths through the network and repeating the steps of training a function approximator on the basis of the new identified plurality of paths.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention enable the inferring of component parameter values in unidentifiable networks, that is in networks in which the number of available probing paths is insufficient to enable a unique solution for individual component parameter values. The network may include multiple nodes, for each of which the component parameter may take a different value. In the examples discussed below, the component parameter is node queuing time, giving an indication of the congestion status of the network. However, it will be appreciated that this is merely for the purpose of illustration, and values of different component parameters may be inferred using processes according to the present invention.

Figure 1:
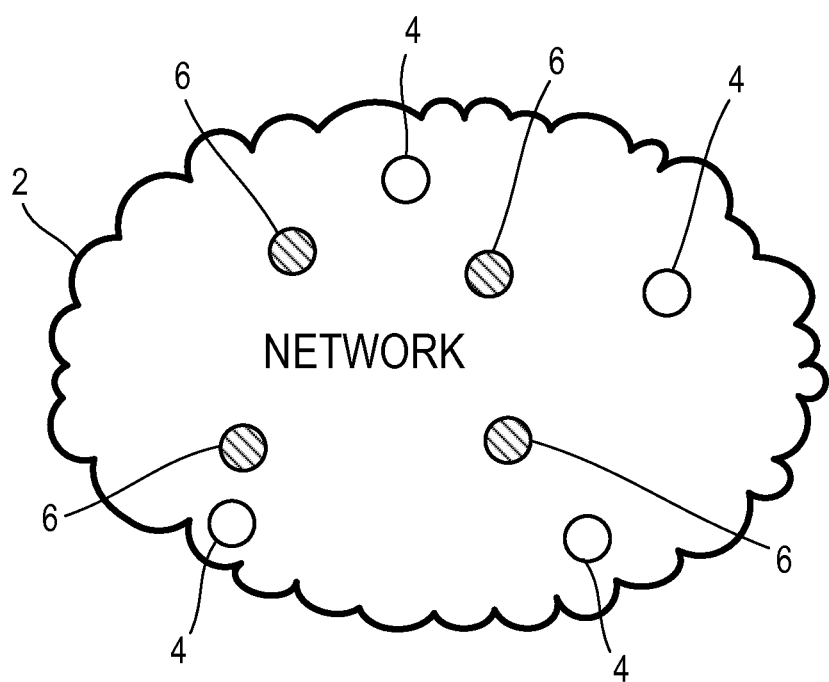
FIG. 1 is a schematic representation of a network.
Figure 2:
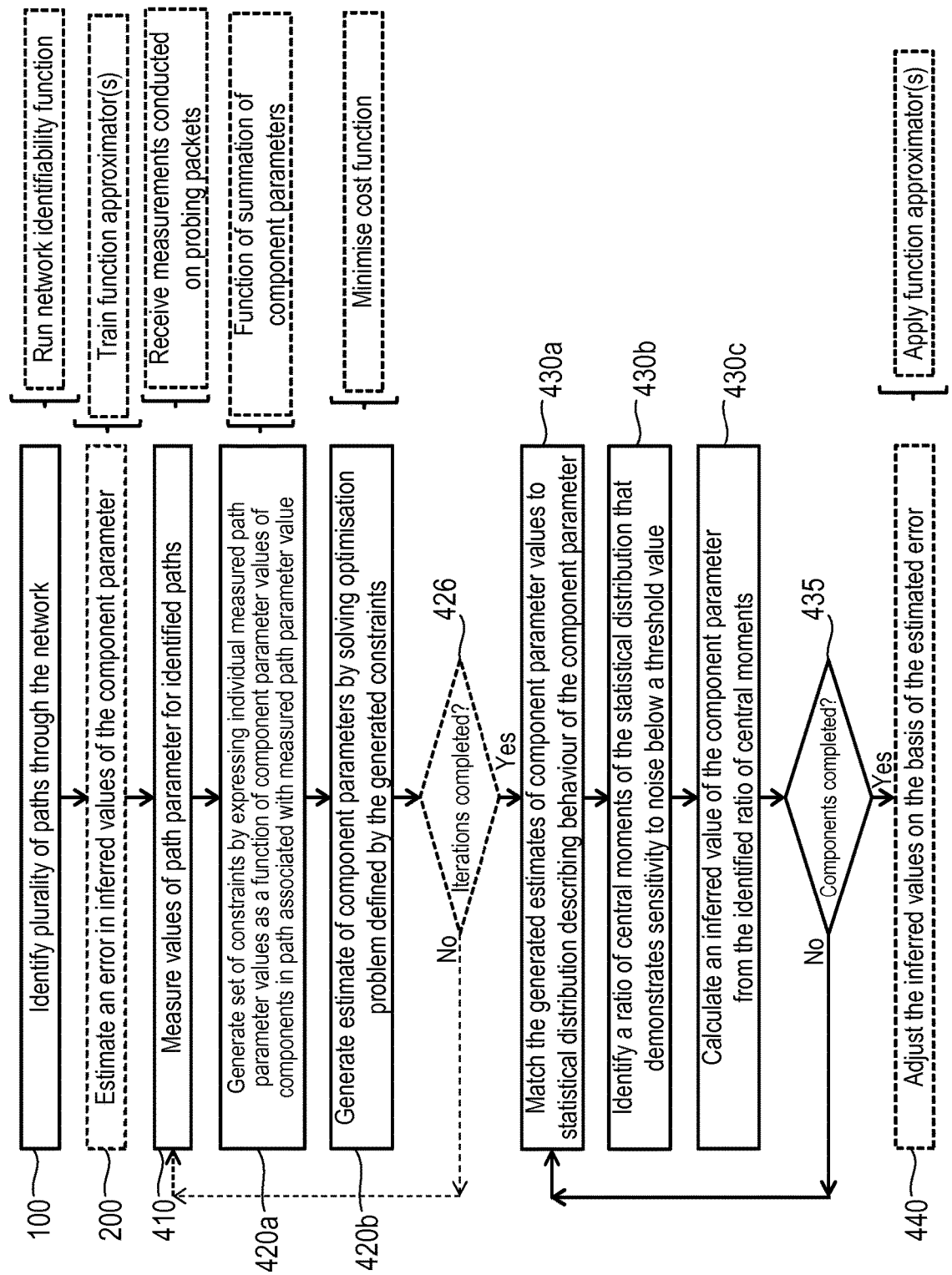
FIG. 2 is a flow chart illustrated process steps in a method for inferring component parameters for components in a network.

FIG. 2 is a flow chart illustrating process steps in a method for inferring component parameter values for components in a network. The components may be network nodes or they may be links between the network nodes. The method may for example be conducted in a processing unit of an apparatus for Network Tomography. The processing unit may be in communication with an input/output unit for communication with nodes in the network, and with a memory. Referring to FIG. 2, in a first step 100, the method comprises identifying a plurality of paths through the network. This may be accomplished using an identifiability problem solver, such as is known in the field of Network Tomography. In some examples, the method may then comprise a step 200 of estimating an error in inferred values of the component parameter. This may be achieved for example through training one or more function approximators using training values of component parameters. The error estimated may be a function of one or more of the topology of the network concerned, the particular paths identified in step 100 and interaction and/or interference between individual component parameters.

The method then comprises, at step 410, measuring values of a path parameter for paths identified in step 100. In practice, the actual measurements may be conducted on probing packets sent along the paths by monitoring probes placed on nodes at the ends of the paths. These measurements may be received by the processing unit on which the method is running. The method then comprises, at step 410*a*, generating a set of constraints by expressing individual measured path parameter values as a function of component parameter values of components in the path associated with the measured path parameter value. In the case of an additive component parameter, the measured path parameter value may be expressed as a function of the summation of the component parameter values. At step 420*b*, the method comprises generating an estimate of the component parameter values by solving the optimisation problem defined by the constrains generated at step 420*a*. This may for example involve minimising an appropriate cost function.

Steps 420*a* and 420*b* represent a Non Linear Programming (NLP) operation in which measured path parameter values on identified paths may be used to define an NLP optimisation, a solution to which may be found by iterative minimisation of a cost function. The solution found may be one of many possible solutions, meaning the estimate of component parameters generated in step 420*b* is just one of many possible estimates. In some examples of the invention, steps 410, 420*a* and 420*b* may represent an iteration which may be repeated until an exit condition is satisfied. The exit condition may for example be a number of iterations corresponding to a predetermined minimum accuracy level. In such examples, a check on the number of iterations may be made at step 426. In each iteration, new measurements may be made of path parameter values, and new estimates of the component parameters may be generated using the NLP operation of steps 420*a* and 420*b*.

Once steps 420*a* and 420*b* have been completed, or if iteration is conducted, once the desired number of iterations has been completed, the method proceeds to step 430*a*, in which, for a first component in the network, the generated estimates of the component parameter value are matched to a statistical distribution that describes the behaviour of the component parameter. This distribution may in some examples be an Inverse Gaussian, Pareto or Weibull distribution. The distribution may be selected as that distribution that best represents behaviour of the component parameter to be inferred. In step 430*b*, a ratio of central moments of the selected statistical distribution is identified which demonstrates a sensitivity to noise below a threshold value. This threshold value may be set to be the lowest noise sensitivity of any of ratio of central moments of the statistical distribution. In step 430*c*, the method comprises calculating an inferred value of the component parameter for the component from the identified ratio of central moments. The inferred value may be the mean of the matched statistical distribution as calculated from the selected ratio of central moments. At step 435 a check is made as to whether the required components have been considered, if not, the method returns to step 430*a* and continues for the next component in the network.

If an estimation of error has been made in step 200, then the method may further comprise adjusting the inferred values from step 430*c* on the basis of the estimated error at step 440. This may for example comprise applying the function approximator trained in step 200.

The method steps illustrated in FIG. 2 are explained in greater detail with reference to an example embodiment of the method, illustrated in FIGS. 3 to 7. In the example embodiment, the network components are network nodes and the component parameter values provide an indication of network congestion status. Using NLP, a solution may be found for each node parameter value that fits an incomplete set of equations generated of the basis of measurements conducted on probing packets sent along measurement paths. The NLP gives a first rough estimation of the unknown node parameter values. As the NLP converges to one of the possibly infinite solutions to the incomplete set of equations, the estimated values are affected by an error that may range between 0% and 200%. Repeating the measurements and evaluations several times produces a set of estimated values for each unknown node parameter, which estimated values may be considered as a group of determinations (samples) of a stochastic process with a specific characteristic distribution. In a worst case scenario, it is possible to assume that each sample represents the correct value plus a noise component with uniform distribution, which noise component may dominate the sample value. In order to filter out the noise component, a statistical distribution is selected that describes the behavior of the unknown parameter. In the example embodiment, Pareto, Weibull and Inverse Gaussian may all be appropriate. The samples obtained from the NLP process are matched to the selected statistical distribution, and a ratio of central moments of the distribution is selected that is relatively insensitive to noise. From this ratio of central moments, the mean value of the node parameter for each node of interest may be calculated.

A residual estimation error remaining after calculation of the mean value of node parameters will be a function of the topology of the individual network under consideration, the particular monitoring paths used and any interaction and/or interference between the individual node parameter values. This estimation error may be evaluated using training values, for example provided using a Monte Carlo simulation. A Monte Carlo simulation may be executed in order to provide input data to a set of adaptive function approximators, one for each node to be evaluated. The function approximators may learn the behavior of the estimation error on each node for which a parameter value is being inferred. Once the function approximators have been trained using the simulation values, the function approximators may be used to adjust the mean values for each node parameter according to the estimated error. Thus, during operation, the function approximators may be supplied with the calculated mean values from the NLP and matched statistical distribution, and may provide as output the final inferred value, including estimated error correction. In this manner, error in the final inferred values may be reduced by approximately 60%. As discussed in further detail below with respect to verification trials, the final estimation error in inferred values may be reduced to between 0% and 10%.

Figure 3:
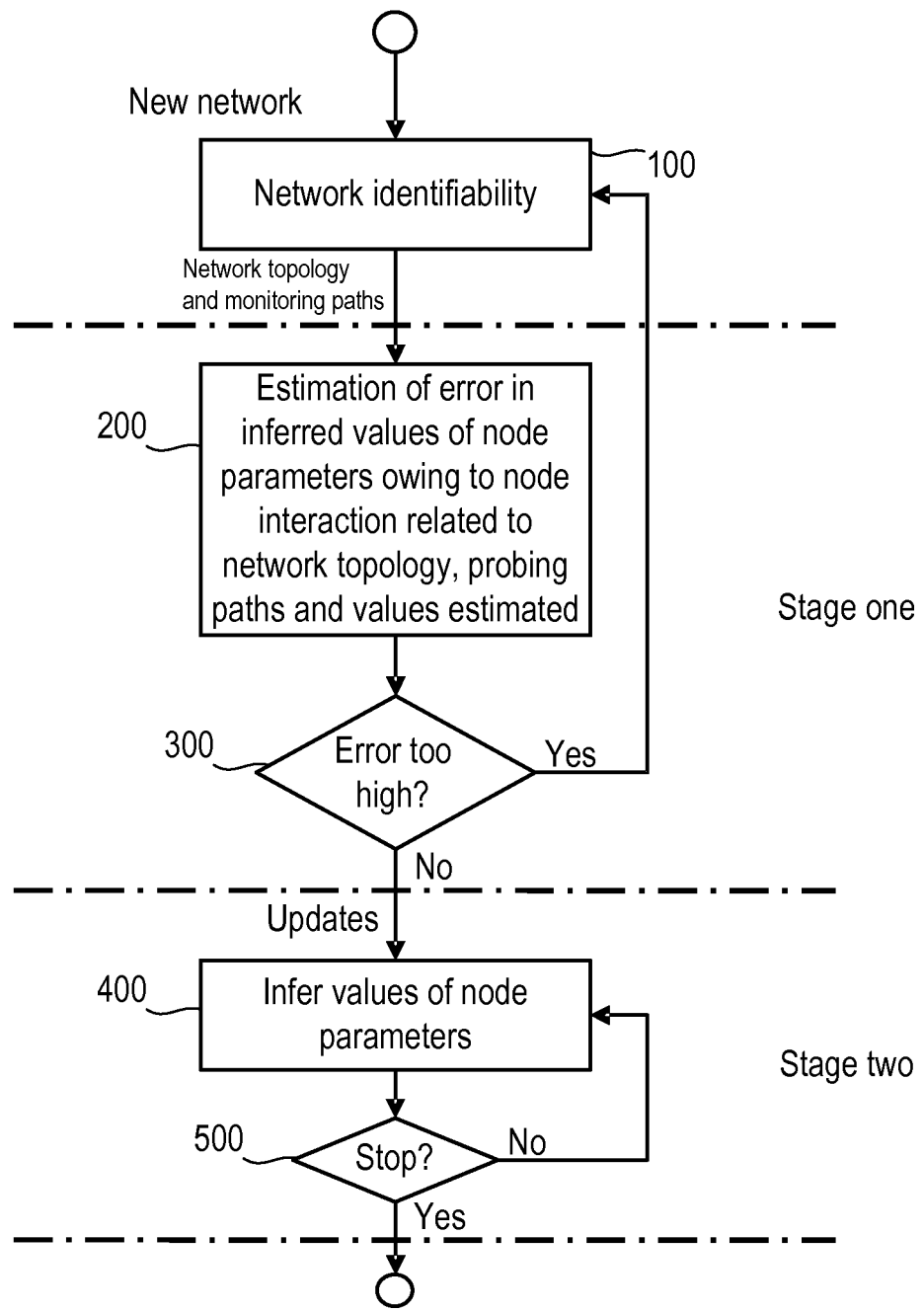
FIG. 3 is a flow chart illustrating a an example of a method for inferring component parameters for components in a network.

Referring to FIG. 3, the example embodiment of the method according to the present invention may be seen to comprise two main stages. Stage one is executed offline and may be executed once at the beginning of an investigation of a network and again in the event that network topology changes for any reason. Stage one is used to estimate the error that will affect parameter estimations as a result of network topology, the set of monitoring paths used and interaction or interference between the values associated to unknowns at each measurement phase. Stage two executes path measurements, conducts the preliminary NLP estimation of the unknowns and the statistical estimation of the unknowns to obtain their correct value.

Stages one and two are preceded by a network identifiability analysis 100, during which network topology is determined and monitoring paths are identified. Any addition or removal of links or nodes in the network modifies the network topology, meaning the network identifiability analysis 100 should be repeated. Once the set of monitoring paths are identified, the network topology and monitoring paths are passed to Stage one of the process.

Figure 4:
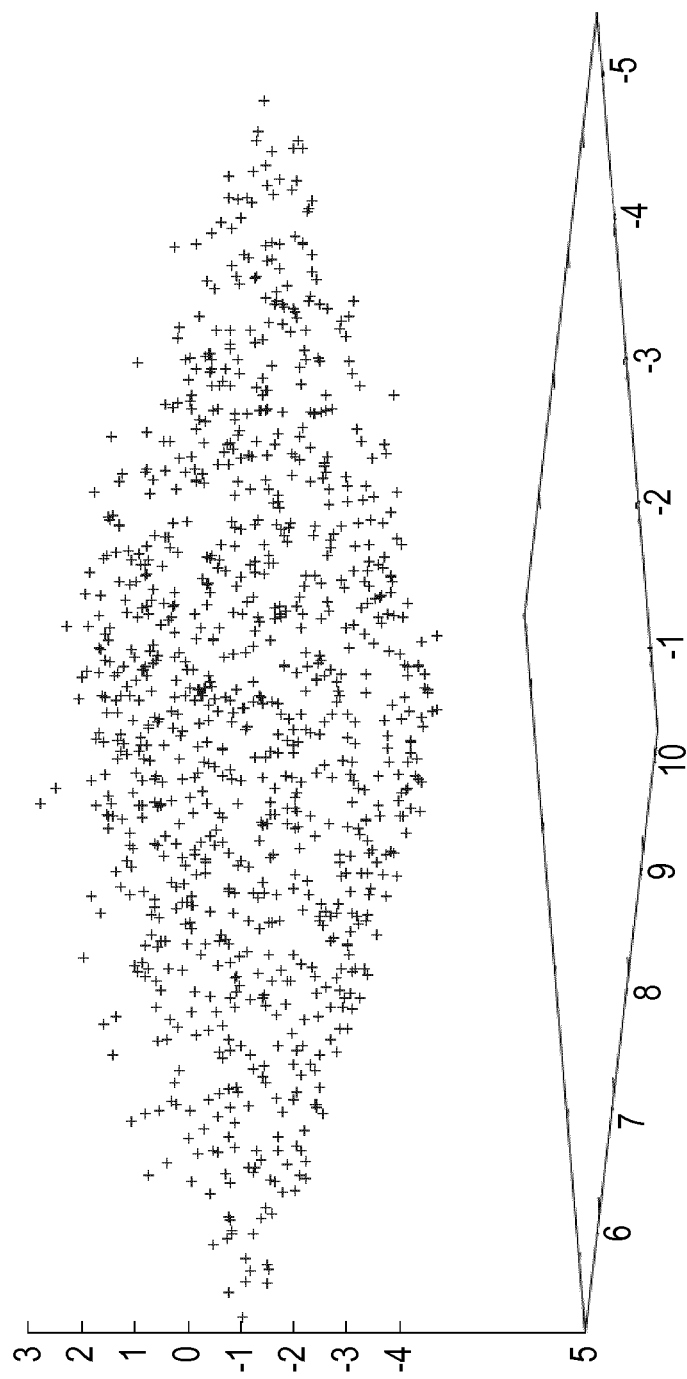
FIG. 4 is a graph illustrating the results of a Monte Carlo simulation.

Stage one comprises an evaluation step 200, in which estimation error in inferred values of node parameters is evaluated, and a check step 300, in which the size of the evaluated estimation error is considered. If the evaluated estimation error is judged to be too high in step 300, the process returns to network identifiability analysis 100 to identify a new set of monitoring paths and repeat the estimation error evaluation 200 with the newly identified paths. The evaluation step 200 comprises evaluating the estimation error on each point of interest of the network using a simulation such as a Monte Carlo simulation. During this simulation, training values for node parameters are selected and a simulated measured path parameter is generated for each monitoring path using the identified monitoring paths from step 100 and the selected training values for node parameters of nodes in the paths. These simulated measured path parameters are then input to the NLP and statistical matching of the method for inferring node parameters, and the inferred values of node parameters from the method are compared to the correct values for the node parameters (the selected training values). Repeating this simulation, the estimation error for each node may be evaluated. It has been found that the estimation error is a function of network topology, monitoring paths and interaction between individual node parameter values. In an example embodiment, the estimation error describes a surface as illustrated in FIG. 4.

Figure 5:
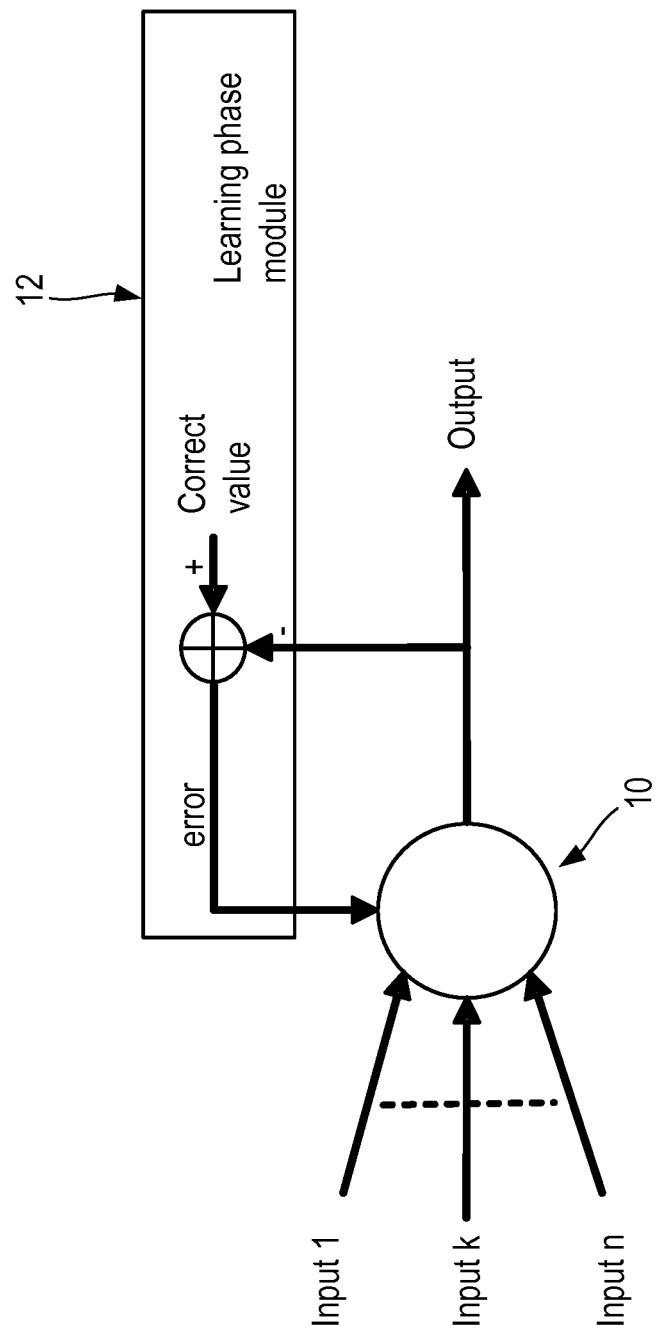
FIG. 5 is a functional representation of a function approximator.

The estimation error surface may be described using a function approximator such as a fuzzy universal approximator or a neural network. The Monte Carlo simulation result may be used as input for a learning phase of a function approximator, modeling the mean value of the node parameter after correction for estimation error. The learning phase of a function approximator is illustrated in FIG. 5. Each function approximator 10 is a multiple input-single output function, meaning an approximator is needed for each parameter to be estimated, or at least for each parameter demonstrating significant estimation error on the basis of a Monte Carlo simulation. The inferred values for mean node parameter following NLP and statistical matching are input to a learning phase module 12 of the function approximator 10 during the learning phase, together with the correct training values, enabling the function approximator to learn the behavior of the estimation error on each node parameter, and so output a mean value of inferred node parameter that is corrected for the estimation error.

Once the learning phase of the function approximators is completed, and the evaluated estimation error has converged, the error is checked at step 300 to ensure that the converged error is not above a threshold value. If the evaluated estimation error is too high, indicating that the error correction will not sufficiently reduce the overall error in the final inferred values, then the process returns to network identifiability analysis to identify a new set of monitoring paths and repeat the Monte Carlo simulation and estimation error evaluation. If the estimation error is below the threshold value, then the function approximators are ready to be used as the last step in inferring node parameters, the estimated mean values of the node parameters being input to the function approximators, and the error corrected values being output as the result of the function approximators.

Having completed Stage one, Stage two may begin, in which online estimation of node parameter values is conducted in step 400 until a stop condition is reached at step 500. In the present embodiment, the parameter to be inferred is node congestion status. In order to infer node congestion, measurements of inter-arrival time for packets transmitted along the monitoring paths can be used as measured path parameter values. This represents a broad example of applicability of the example embodiment, with inter-arrival time including both additive components, in which contributions from each node in the path are summed, and non additive components.

Inter-arrival time is measured with relation to each link between nodes, and may be expressed as:

$$IT = T_p + T_r + T_n + T_q$$

Where:
IT is the inter-arrival time on a path;
$T_p$ is the connection period;
$T_r$ is the transmission time of a packet;
$T_n$ is node processing time; and
$T_q$ is node queuing time.

Supposing an interconnection of 1 Gbps and a packet of minimal size (64 bytes), $T_r$ is 672 ns. $T_n$ is typically around 10 us and $T_q$ can range from 0 up to k ms. Supposing a queuing delay in the range 0 to 5 ms, $T_r$ and $T_n$ may be seen to be negligible for practical purposes. IT may thus be expressed as:

$$IT \cong T_p + T_q$$

The distribution for inter-arrival time is mainly caused by queuing, meaning inter-arrival time provides a good direct indication of the congestion occurring in the network at the different output ports of nodes.

On the basis of the previous assumptions, inter-arrival time at a measurement point on a monitoring path can be approximated as $$IT \cong T_p + T_q = T_p + \sum_i T_{q_i}$$

Where $T_{q_i}$ are the queuing delays of each node on the relevant path.

Whereas $T_q$ is an additive variable, $T_p$ is a constant term, always the same at each output port (link) of the nodes. In order to be able to consider the unknown node parameter as an additive parameter, measurements of IT are decreased by the value of $T_p$ before solving the NLP problem. The value of $T_p$ is then added back to each estimate generated by the NLP in order to reconstruct the IT associated to each output port (link) before applying the statistical models. Finally, node congestion can be inferred by subtracting $T_p$ from the estimation in order to get the mean $T_{q_i}$ affecting each output port (link). It will be noted that in the event of a multiplicative variable, the log function of the variable may be used to render the variable additive.

As discussed above, NLP is used to determine a first rough evaluation of unknowns. Specifically, for each sample vector y of measurements at a probe point on a monitoring path:
{subtract $T_p$ from each component of y vector
Minimize $$c = \sum_i e^{-x_i} + \sum_j [y_j - f_j(\bar{x})]^2$$

with $$f_j(\bar{x}) = \sum_{k \in P_j} x_k$$

Where $P_j$ is the set of links belonging to path j and $x_k$ the variables associated to each link.
Collect each estimated $x_k + T_p$ in a vector $V_k$}

The NLP merit function includes a first term to keep the unknowns positive and a second term representing a least squares minimization of the difference between the measurements and the sum of the contribution to jitter by each node output on the corresponding monitoring path. As mentioned above, $T_p$ is removed before optimization and added again at the end to provide a rough evaluation of IT.

The NLP method is repeated n times to get a set of vectors $V_k$ sufficiently large to make statistical evaluations. Each determined vector $V_k$ represents a group of determinations (samples) of a stochastic process related to the $k^{th}$ unknown. Specific distribution functions characterize the metric to be evaluated. In the example embodiment considering inter-arrival time, the metric shows a behavior that can be described using distributions including Pareto, Weibull and Inverse Gaussian. For the purposes of illustration, the inverse Gaussian distribution is selected in the present explanation. Considering the inverse Gaussian distribution, the ratio between variance and squared skewness or kurtosis is found to be relatively insensitive to uniform noise. The variance, skewness and kurtosis can be estimated from the samples generated by the NLP operation using standard methods. In the following example, skewness is used as providing a ratio that is least sensitive to noise.

Variance is given by:

$$\sigma^2 = \frac{\mu^3}{\lambda}$$

Where $\mu$ is the mean value and $\lambda$ is the distribution shape factor.

Skewness is given by:

$$sk = 3\left(\frac{\mu}{\lambda}\right)^{1/2}.$$

The ratio variance over skewness squared is:

$$\frac{\sigma^2}{sk^2} = \frac{\mu^2}{9}$$

The mean value $\mu$ can thus be expressed as function of variance and skewness:

$$\mu = 3\frac{\sigma}{sk}$$

Through application of the above equation, the mean value of the parameter to be inferred may be calculated. Each unknown mean value is calculated starting from the relevant vector $V_k$ which contains the set of estimates for values of the parameter of the node k generated by NLP, the unknown mean value is then corrected using the function approximators trained in Stage 1:

For each $x_k$
{estimate $\mu_k$ from $V_k$ using the statistical model
$\mu_k'$=Depolarized $\mu_k$}
For each $x_k$
{$\mu a_k'$=$\mu_k'$ adjusted using the related approximator
$\mu_k''$=Depolarized $\mu a_k'$
CongestionIndex$_k$=$\mu_k''$−$T_p$}

The above discussion provides an overview of Stages one and two of the example embodiment, in which estimation error is evaluated and node parameter values are inferred. Error estimation and inferring of parameters are described in greater detail below, with reference to FIGS. 6 and 7, which illustrate detailed algorithms for each of these processes.

Figure 6:
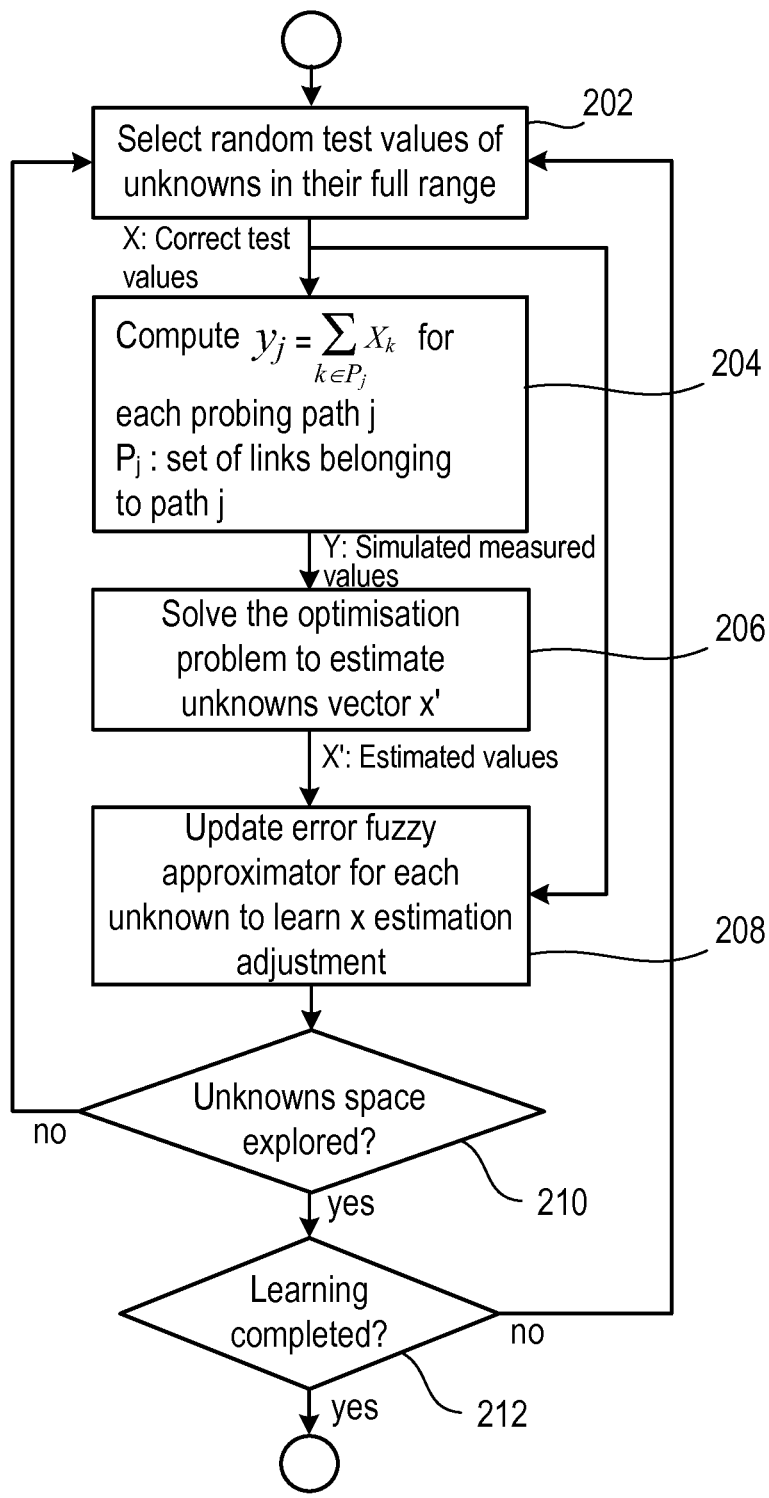
FIG. 6 is a flow chart illustrating a further detail of the example method of FIG. 3.

FIG. 6 illustrates process steps conducted in step 200 of the example method of FIG. 3. The process of FIG. 6 thus takes place following network identifiability analysis 100 in which network topology is established and monitoring paths are identified. Referring to FIG. 6, in a first step 202, a random value for each unknown is selected within the range for that unknown. In some examples, a uniform distribution may be used for the random selection of unknown values. These randomly selected values are assembled into a vector X of the correct training values for the unknown node parameters. In step 204, a simulated path measurement $y_j$ is calculated for each monitoring path j by summing, for each path j, the correct training values of the node parameters for each node in the path. These simulated path measurements are assembled into a measurement vector Y. In step 206, the measurement vector Y is input to the NLP and statistical matching to generate an estimate X' of the unknown node parameters. As discussed above, this is done by minimizing:

$$c = \sum_i e^{-x_i} + \sum_j [y_j - f_j(\bar{x})]^2$$

with $f_j(\bar{x}) = \sum_{k \in P_j} x_k$

Where $P_j$ is the set of links/nodes belonging to path j and $x_k$ the variables associated to each link/node.

The estimated values X' and correct values X are then fed into the learning phase of the function approximators for each unknown at step 208, enabling the function approximators to learn how to adjust X' in order to arrive at the correct X. At step 210, a check is performed to establish whether or not the complete unknowns space has been explored. If not, the process returns to step 202, selecting a new set of training values from within the unknown parameter range and conducting the subsequent steps 204 to 210. If at step 210 it is determined that the unknowns space has been completely explored, a check is then made at step 212 as to whether or not the learning has been completed, that is whether or not the function approximators have converged to an estimated error. If learning has not been completed, the process returns again to step 202 to select a new set of training values and continue the learning process. If learning has been completed, then step 200 is complete, and the check 300 of Stage one is performed to determine whether or not the converged error is sufficiently small to continue. The process of FIG. 6 is thus repeated until the complete random field of unknowns has been sufficiently explored, the approximators have converged and the converged error is below a specified threshold.

Once the estimation error evaluation of Stage one has been completed, the process continues to Stage two and the step 400 of inferring node parameters. This process is illustrated in the flow chart of FIG. 7.

Figure 7:
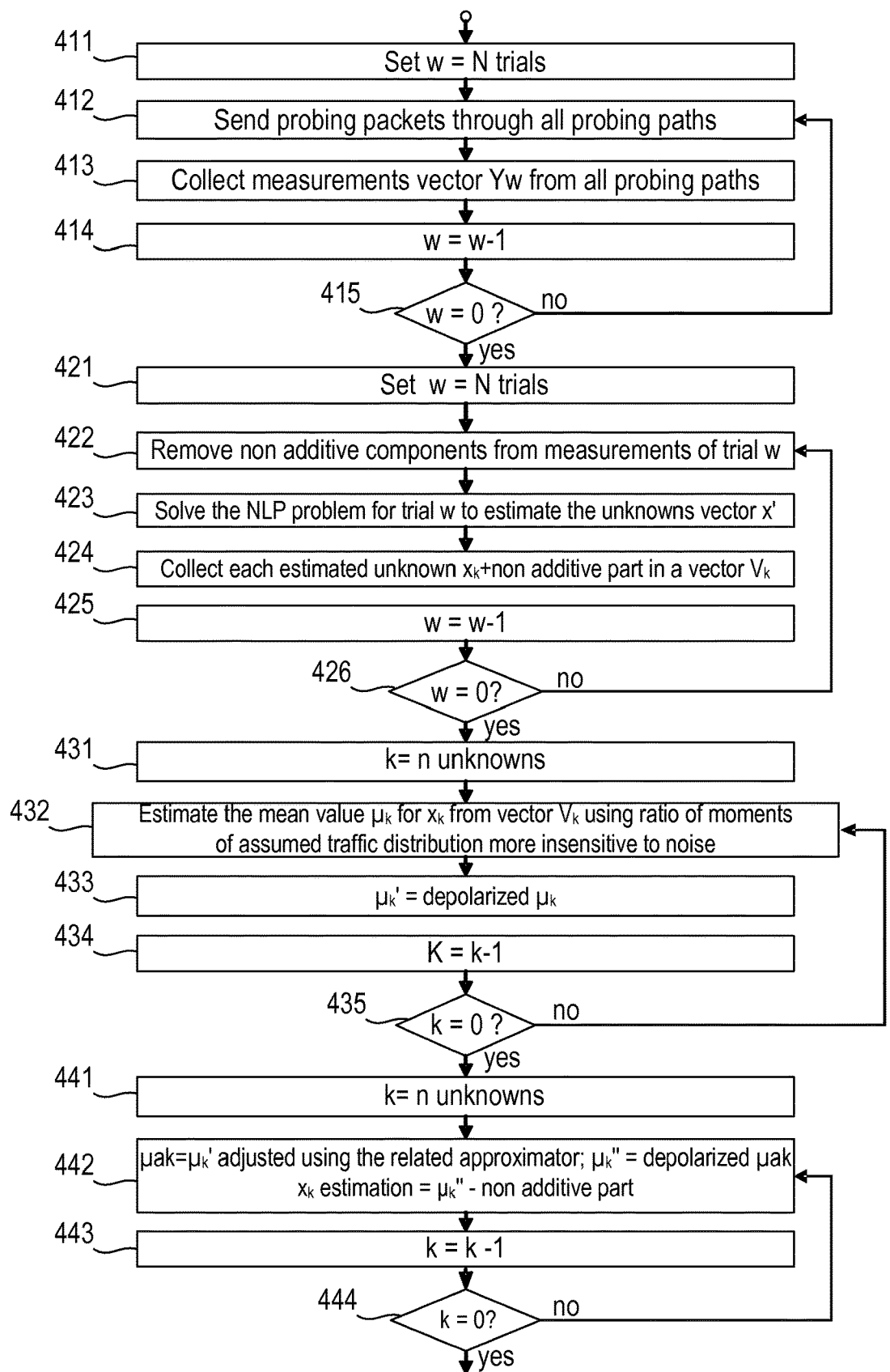
FIG. 7 another flow chart illustrating a further detail of the example method of FIG. 3.

Referring to FIG. 7, a process is illustrated in which a number of trials are performed, each trial comprising the measuring of inter-arrival time of probing packets transmitted on the identified monitoring paths. In the nomenclature of the flow chart of FIG. 7, "w" is the trial number, which ranges from 1 to a total of N trials. The total number of trials N may be set according to a testing period, a level of accuracy desired or any other factor. A process for selecting N as a function of accuracy required is discussed more fully below, with reference to the accuracy of the process of the present invention. The number of unknowns n is equal to the number of nodes or links in the network being investigated, with "k" representing an unknown from 1 to n.

In a first step 411, the process of FIG. 7 sets a trial counter w to equal N, the total number of trials to be performed. Probing packets are then sent simultaneously along all paths in step 412, and a measurements vector $Y_w$ is assembled in step 413. Each element of the measurements vector $Y_w$ is an IT measurement for a path for that particular trial. The measurements vector $Y_w$ thus has a number of elements equal to the number of identified monitoring paths. Sending the probing packets simultaneously provides a complete picture of the network at a given moment in time. Once the measurements vector $Y_w$ has been collated, the trial counter w is reduced by 1 at step 414 and a check is made at step 415 as to whether the counter has reached zero. If the counter has not reached zero, the process returns to step 412 to re-send probing packets along all the paths and assemble a new measurements vector for the new trial. This process is repeated until all the set number of N trials have been completed. The N trials are executed at the highest rate possible, in order to collect closely related information. The probing connection rate is a function of the number of packets to be sent and the time interval in which the network is considered stable. Typically the operation may be executed in a time interval spanning between a few seconds and one minute.

Once the trials have been completed and the measurements are all available in a series of measurement vectors $Y_w$, an offline phase begins, in which node parameters are inferred. The trial counter w is reset to N, the total number of trials, in step 421 and in step 422, non additive components are removed from the elements of the vector $Y_w$ for the currently considered trial w. Referring to the earlier discussion, in the case of IT measurements, this involves subtracting out the $T_p$ component from each IT measurement in the measurements vector $Y_w$. The NLP problem is then solved at step 423 by minimizing a cost function as discussed above. This results in an unknowns vector x' containing the estimated values of the unknown parameters on the basis of the current trial w. In step 424, each estimated unknown parameter value is collected into an estimation vector $V_k$ for a particular node k together with the non additive component which is added back into the additive component. The trial counter is then decreased by one in step 425 and a check is made at step 426 as to whether the trial counter has reached zero. If the trial counter has not reached zero, the process returns to step 422 and removes non additive components and solves the NLP problem for the results of the next trial, using the appropriate measurements vector $Y_w$ for that trial. The NLP problem is thus solved a total of N times, each time using a different measurements vector $Y_w$ from a different trial. In each iteration, at step 424, a new element is added into each vector $V_k$ containing the estimated unknown parameter value from the currently considered trial, plus the non additive component. Once the iterations are complete (when the trial counter has reached zero), each unknown variable $x_k$ will have a corresponding vector $V_k$ containing a number of estimated values of $x_k$ equal to the number of trials N.

An unknowns counter k is set to the number n of unknowns in step 431. An estimate of the mean value $\mu_k$ for the unknown $x_k$ is calculated at step 432 from the vector $V_k$. The mean value $\mu_k$ is calculated using a ratio of central moments of a matched statistical distribution which has a sensitivity to noise below a threshold value. As discussed above, in the case of a matched distribution that is an inverse Gaussian distribution, the ratio of central moments may comprise variance over skewness squared. Also as discussed above, the elements of the $V_k$ vector, the estimates generated by the NLP operation, are affected by an error that demonstrates a behaviour similar to uniform distribution noise. Calculating a mean value for the node parameter using a ratio of central moments that is relatively insensitive to noise cancels this noise contribution.

The calculated mean value $\mu_k$ may be polarized as a result of estimators so depolarization is applied at step 433 to generate a depolarized mean value $\mu_k'$. The unknowns counter k is then decreased by one at step 434 and a check is made at step 435 whether or not the unknowns counter has reached zero. If the unknown counter k has not reached zero, the process returns to step 432 and calculates the mean value for the next unknown. Once a depolarized mean value has been calculated for all unknowns, the process proceeds to step 441, in which the unknowns counter is again set to the number n of unknowns. In step 442, the depolarized mean value $\mu_k'$ for the unknown $x_k$ is adjusted using the related function approximator, trained in Stage one. This adjustment compensates for the estimation error evaluated in Stage one which is a function of at least one of network topology, identified paths and interaction of node component values. The resulting adjusted value $\mu a_k$ is then depolarized again to produce a depolarized adjusted value $\mu_k''$. The final inferred value for the unknown $x_k$ is then calculated by removing the non additive component $T_p$ from the depolarized adjusted value $\mu_k''$. In step 443, the unknowns counter is decreased by one and at step 444 a check is performed as to whether or not the unknowns counter has arrived at zero. If the unknowns counter k is not zero, then all of the unknown parameters have not yet been inferred, and the process returns to step 442 to generate the final inferred value for the next unknown. Once all of the unknowns have been inferred, the process terminates.

Figure 8:
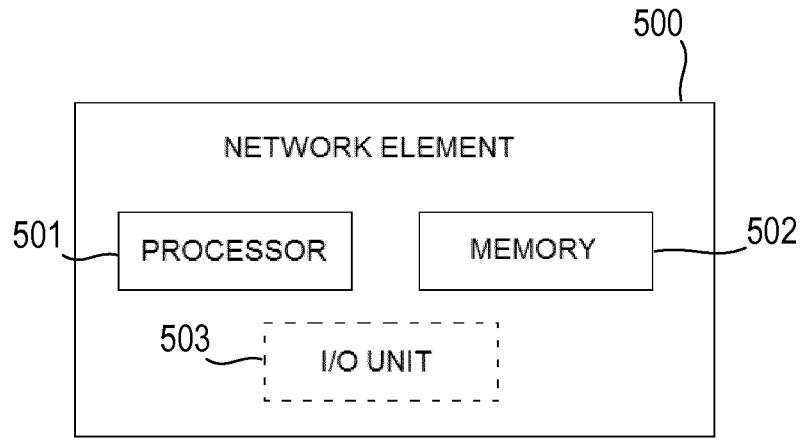
FIG. 8 is a block diagram illustrating functional elements in a network element.

As discussed above, the process of the present invention, as explained with reference to the example embodiment of FIGS. 3 to 7, may be conducted in a processing unit of a network element. The process may be implemented on receipt of suitable computer readable instructions, which may be embodied within a computer program running on a network element. FIG. 8 illustrates a first example of a network element which may execute the process of the present invention, for example on receipt of suitable instructions from a computer program. Referring to FIG. 8, the network element 500 comprises a processor 501 and a memory 502. The memory 502 contains instructions executable by the processor 501 such that the network element 500 is operative to conduct the steps of the process of FIGS. 2, 3, 6 and/or 7. The memory may also store measurements and processing data generated during the process. The network element 500 may also comprise an Input/Output unit 503, for example enabling communication with a network to be analysed, for example via the exchange of probing packets.

Figure 9:
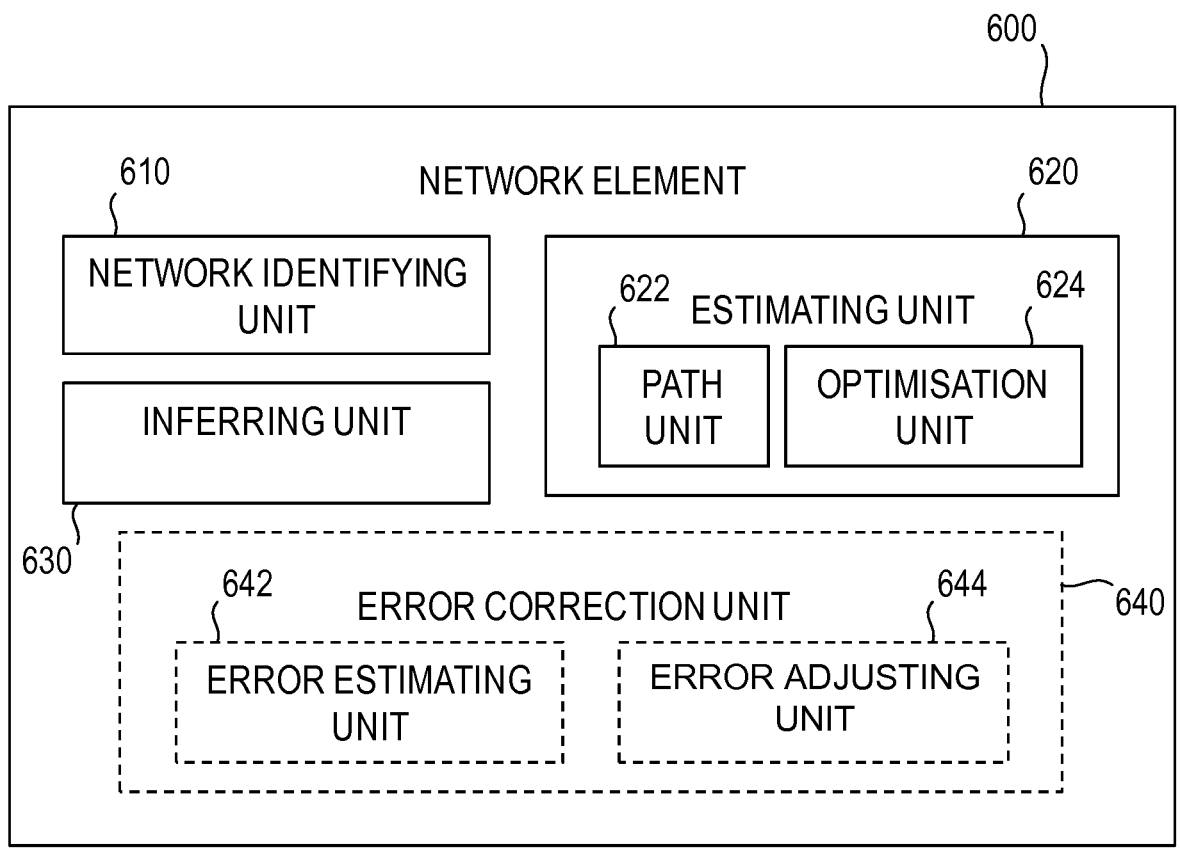
FIG. 9 is a block diagram illustrating functional elements in another example of network element.

FIG. 9 illustrates functional units in another example of network element 600 which may execute the process of the present invention, for example according to computer readable instructions received from a computer program. It will be understood that the units illustrated in FIG. 9 are functional units, and may be realised in any appropriate combination of hardware and/or software.

Referring to FIG. 9, the network element comprises a network identifying unit 610, an estimating unit 620, comprising a path unit 622 and an optimisation unit 624, and an inferring unit 630. The network element 600 may also comprise an error correction unit 640 comprising an error estimating unit 642 and an error adjusting unit 644. The network identifying unit 610 is configured to determine network topology and to identify a plurality of monitoring paths through the network, for example through running a Network Tomography identifiability problem solving function. The path unit 622 of the estimating unit 620 is configured to measure a path parameter value for paths identified by the network identifying unit 610. This may comprise receiving a measured value from a probe on a network node at an end of a monitoring path. The optimisation unit 624 of the estimation unit 620 is configured to generate a set of constraints by expressing measured path parameter values as a function of component parameter values of the components in the path associated with the measured path parameter value, and to generate an estimate of the component parameter values by solving an optimisation problem defined by the generated constraints. In some examples, the estimating unit 620 may be configured to repeat the functions of the path unit 622 and optimisation unit 624 until an exit condition is satisfied, for example until a predetermined number of trials has been completed. The inferring unit 630 is configured, for individual components in the identified paths, to match the generated estimates of the component parameter value to a statistical distribution describing a behaviour of the component parameter. The inferring unit 630 is also configured to identify a ratio of central moments of the statistical distribution that demonstrates a sensitivity to noise below a threshold value and to calculate an inferred value of the component parameter from the identified ratio of central moments.

If present in the network device, the error estimating unit 642 of the error correction unit 640 is configured to estimate an error in the inferred values of the component parameter, and the error adjusting unit 644 of the error correction unit 640 is configured to adjust the inferred values of the component parameter on the basis of the estimated error.

The scalability, execution time and accuracy of the method of the present invention may be evaluated using test scenarios. In a first example, the following network scenarios may be considered, based upon information obtained from Network Management System experts:

Network with 20K, 50K, 100K nodes (these represent projections for future network sizes, current networks rarely comprising more than 100 to 200 nodes).

Mesh-degree: 2 (mean number of links leading toward to each node).

Network segmentation in 5 regions.

In the following example, two processors are considered: an Intel desktop i7 3900 processor operating at 3.066 GHz, and having a processing capacity according to Intel specification of 182 GFLOPS in the boosted configuration, and a processing accelerator for workstations based on TESLA GPU by NVIDIA, that reaches more than 4 TFLOPS.

TABLE 1

| Network configuration | Number of samples per probing point | I7 computation time | TESLA computation time |
| --- | --- | --- | --- |
| 20k nodes | 1 Million | 66 s | 3 s |
| 50k nodes |  | 165 s | 7.5 s |
| 100k nodes |  | 5.5 min | 15 s |
| 20k nodes | 10 Million | 11 min | 30 s |
| 50k nodes |  | 27.5 min | 75 s |
| 100k nodes |  | 55 min | 150 s |

The measurement phase (steps 411 to 415 of FIG. 7) is performed in a very short time to ensure that all samples refer to the same statistical conditions in the network. For each trial, probing packets are sent simultaneously from each source point in order to obtain a picture of the network at a single point in time. As discussed above, the probing connection rate is a function of the number of packets to be sent and the time interval in which the network status is considered stable. Typically the operation is executed in times ranging from a few seconds up to one minute. As can be seen from Table 1, processing of the data obtained during the measurement phase takes about 11 minutes for a network with 20 k nodes and 10M samples. During the processing of acquired samples there are no requirements for the network to maintain its status.

Network performance monitoring is typically performed at 15 minutes intervals. Using 1 million samples this 15 minute schedule can always be maintained with any processor and size of network up to 100 k nodes. With 10 million samples an i7 processor is suitable up to 20 k nodes, but a higher performance processor is needed for larger networks. With 10 million samples, the GPU based processing accelerator is capable of maintaining a 15 minute performance monitoring schedule, even for 100 k node networks.

Accuracy in the inferred values for component parameters depends mainly on the statistical analysis. Simulations demonstrate that the error obtained solving the NLP problem can be modeled as a uniform noise. Methods according to the present invention remove this noise using a statistical approach by finding an expression of the mean value of the unknowns as the ratio of two central moments of the distribution characterising the unknown variable, which ratio is relatively insensitive to noise. In this manner, the noise contribution resulting from the NLP problem solution is cancelled out. The statistical analysis benefits from a reasonable number of samples in order to estimate the central moments with accuracy. In practice 1 to 10 million samples represents a suitable range for a good level of accuracy. It has been observed in test scenarios that estimation accuracy does not improve significantly once the number of samples exceeds 1 million. Each trial during which probing packets are sent along monitoring paths generates a single sample for each unknown parameter value. The number of samples may thus be dictated by the level of accuracy desired. In some examples, the variance of the central moment estimation may be expressed as a function of the number of samples. By selecting a maximum acceptable variance in the central moment estimation, a required number of samples may thus be obtained. This number may be set as the number of trials N, and completing this number of trials may thus be the exit condition for the iteration of the steps of obtaining path parameter measurements and solving the NLP optimization problem to obtain node parameter estimates.

Simulations demonstrate that the final error affecting the inferred parameter values ranges between 2% and 10%. The final error may be estimated using the procedure of stage one illustrated in FIG. 6 in order to obtain in advance the expected accuracy for each unknown parameter value. Knowing the maximum error that can affect the inferred value, it is possible to take this maximum error into account when taking decisions as to corrective or preventative actions to be conducted on the network in light of the inferred parameter values.

Figure 10:
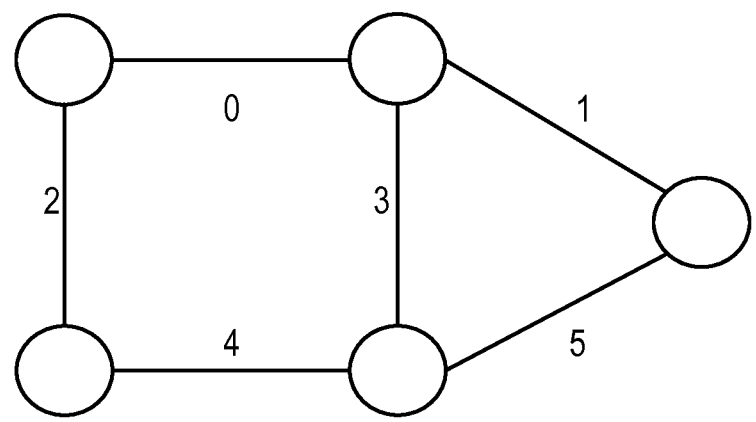
FIG. 10 is a representation of a test network.
Figure 11:
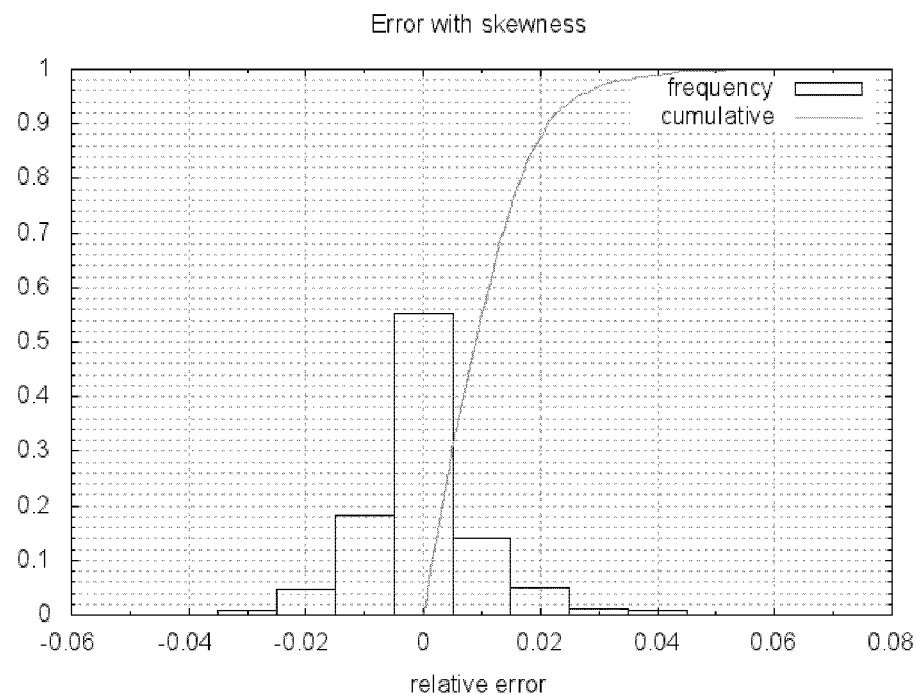
FIGS. 11 and 12 are graphs illustrating results of the example method of FIGS. 3, 6 and 7 applied to the test network of FIG. 10.
Figure 12:
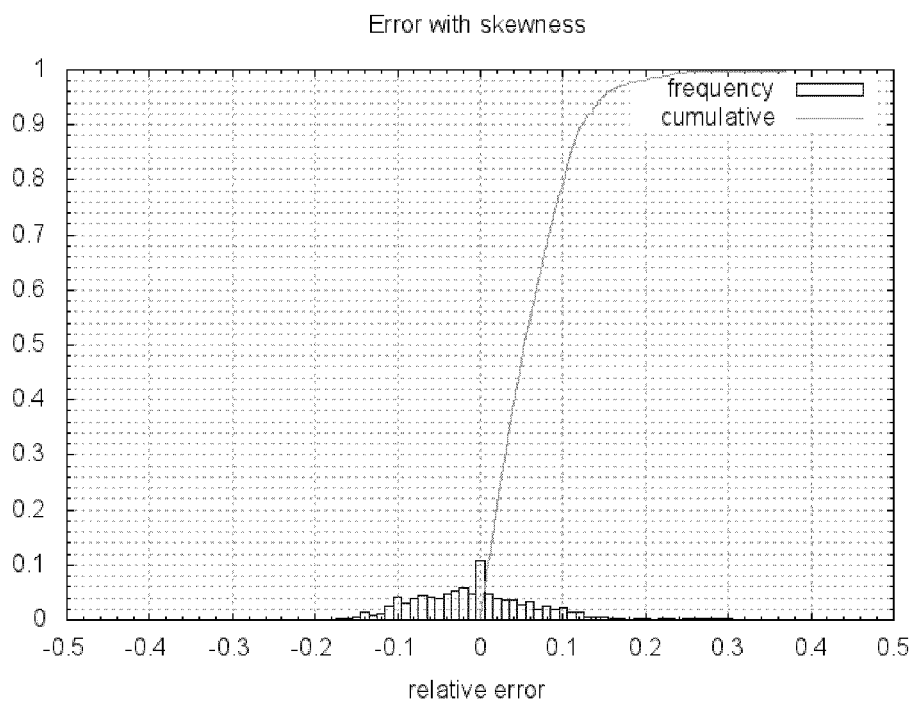

Verification of the method of the present invention is presented below with reference to a test network illustrated in FIG. 10. The test network comprises 5 nodes and six links, labeled 0 to 5. In testing, the following paths were selected by an identifiability algorithm:

$y[0]=x[0]+x[1]$;

$y[1]=x[2]+x[4]+x[5]$;

$y[2]=x[4]+x[5]$;

$y[3]=x[3]+x[5]$;

$y[4]=x[1]$;

The measured path parameter for the test network was inter-arrival time of probing packets and the statistical model chosen was the Inverse Gaussian distribution. The best results, obtained for link 1, are presented in FIG. 11, and the worse case results, obtained for link 5, are presented in FIG. 12. In 90% of cases, it may be seen that the best case inferred parameter was affected by an error of less than 2%, and the worse case inferred parameter was affected by an error of less than 10%, satisfying monitoring requirements.

Embodiments of the present invention thus combine Non Linear programming with statistical models and function approximators to allow estimation of network component parameters in unidentifiable networks. Embodiments of the present invention thus render Network Tomography applicable to practical situations involving IP and IP/MPLS networks, by removing the requirement for full monitoring coverage. The process of the present invention is applicable to heterogeneous networks and does not reply on individual node capabilities, making it very appropriate for modern networks which may involve multiple different network technologies and operators. The accuracy of estimation afforded by the process of the present invention is demonstrated above, and fulfills monitoring requirements for practical applications in existing communication networks.

Embodiments of the present invention may be applied in a wide range of communication networks, including for example mobile, backhaul, transport and core networks. The complexity of mobile networks in particular is increasing rapidly with the introduction of 4G technologies and the development of 5G. The forecast massive introduction of small and micro cells accompanying the evolution to 5G will increase substantially the meshing degree of the access network, with consequent increases in complexity for the monitoring and analysis of network performance and behavior. In addition, such massive deployment of radio units increases the need for the introduction of a fronthaul network, including switches and routers, in order to improve connectivity. Embodiments of the present invention can help significantly in introducing a capillary monitoring of all the devices in the fronthaul network without requiring specific monitoring functionalities at each element or any interoperation among elements. The monitoring and behavior analysis enabled by embodiments of the present invention is compatible with new hardware and protocols which may be introduced in the future.

Similar advantages are offered by aspects of the present invention when applied to other network types, including backhaul, transport and core. Such networks often demonstrate several degrees of heterogeneity, implying a lack of interoperation and control communication among machines and network domains. Embodiments of the present invention are thus particularly useful as they enable the inference of network component parameters without the need for such interoperation and control communication. Additionally, embodiment of the present invention may easily be integrated in any kind of existing or future control and management system, increasing their capabilities in monitoring and analysis of any kind of network.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method for inferring component parameter values for components in a network, wherein the components comprise at least one of network nodes or network links, the method comprising:
    identifying a plurality of paths through the network;
    measuring by monitoring probes placed on nodes at ends of the identified paths, values of a path parameter for the identified plurality of paths;
    generating a set of constraints by expressing individual measured path parameter values as a function of component parameter values associated with individual components in the identified plurality of paths associated with the measured path parameter values;
    generating an estimate for each of the component parameter values by solving an optimisation problem defined by the set of generated constraints; and for each of the individual components in the identified plurality of paths:

matching the generated estimates for each of the component parameter values associated with a corresponding individual component to a statistical distribution describing a behaviour of component parameter;

identifying a ratio of central moments of the statistical distribution that demonstrates a sensitivity to noise below a threshold value; and calculating an inferred component parameter value from the identified ratio of central moments, wherein measuring values of a path parameter for the identified plurality of paths, generating a set of constraints and generating an estimate of the component parameter values comprise a trial iteration; and wherein the method further comprises repeating the trial iteration until an exit condition is satisfied before conducting subsequent method steps, where the exit condition comprises a number of trial iterations corresponding to a predetermined minimum estimation accuracy.

2. A method as claimed in claim 1, wherein expressing a measured path parameter value as a function of component parameter values of the components in the path associated with the measured path parameter value comprises expressing the measured path parameter value as a function of a summation of the component parameter values of the components in the path associated with the measured path parameter value.

3. A method as claimed in claim 1, wherein the components comprise network nodes and the component parameter comprises node queuing time.

4. A method as claimed in claim 1, wherein the path parameter comprises inter-arrival time.

5. A method as claimed in claim 1, wherein solving an optimisation problem defined by the set of generated constraints comprises minimising a cost function according to the set of generated constraints.

6. A method as claimed in claim 1, wherein the optimisation problem comprises a least squares minimisation.

7. A method as claimed in claim 1, wherein calculating the inferred value of the component parameter comprises calculating a mean of a matched statistical distribution from the identified ratio of central moments.

8. A method as claimed in claim 1, wherein the statistical distribution comprises an inverse Gaussian distribution, and wherein identifying the ratio of central moments of the statistical distribution that demonstrates a sensitivity to noise below a threshold value comprises identifying a ratio of variance over skewness or variance over kurtosis.

9. A method as claimed n claim 1, further comprising: estimate an error in the inferred component parameter; and adjust the inferred component parameter value based on the estimated error.

10. A computer program product comprising a non-transitory computer readable medium storing program instruction which, when run by a computer, causes the computer to carry out the method according to claim 1.

11. A network element for inferring component parameter values for components in a network, wherein the components comprise at least one of network nodes or network links, the network element comprising a processor and a memory, the memory containing instructions executable by the processor such that the processor is operable to:

identify a plurality of paths through the network;

measure by monitoring probes placed on nodes at ends of the identified paths, values of a path parameter for identified plurality of paths;

generate a set of constraints by expressing individual measured path parameter values as a function of component parameter values associated with individual components in the identified plurality of paths associated with the measured path parameter value values;

generate an estimate for each of the component parameter values by solving an optimisation problem defined by the set of generated constraints; and, for each of the individual components in the identified plurality of paths:

match the generated estimates for each of the component parameter values associated with a corresponding individual component to a statistical distribution describing a behaviour of the component parameter;

identify a ratio of central moments of the statistical distribution that demonstrates a sensitivity to noise below a threshold value; and calculate an inferred component parameter value from the identified ratio of central moments, wherein measuring values of a path parameter for the identified plurality of paths, generating a set of constraints and generating an estimate of the component parameter values comprise a trial iteration; and wherein the network element is further operative to repeat the trial iteration until an exit condition is satisfied before conducting subsequent method steps, where the exit condition comprises a number of trial iterations corresponding to a predetermined minimum estimation accuracy.

12. A network element as claimed in claim 11, wherein the network element is further operative to express a measured path parameter value as a function of component parameter values of the components in the path associated with the measured path parameter value by expressing the measured path parameter value as a function of a summation of the component parameter values of the components in the path associated with the measured path parameter value.

13. A network element as claimed in claim 11, wherein the component parameter comprises a measure of component congestion.

14. A network element as claimed in claim 11, wherein the components comprise network nodes and the component parameter comprises node queuing time.

15. A network element as claimed in claim 11, wherein the network element is further operative to solve an optimisation problem defined by the set of generated constraints by minimising a cost function according to the set of generated constraints.

16. A network element as claimed in claim 11, wherein the network element is further operative to calculate the inferred value of the component parameter by calculating a mean of a matched statistical distribution from the identified ratio of central moments.

17. A network element as claimed in claim 11, wherein the statistical distribution comprises an inverse Gaussian distribution, and wherein the network element is further operative to identify the ratio of central moments of the statistical distribution that demonstrates a sensitivity to noise below a threshold value by identifying a ratio of variance over skewness or variance over kurtosis.

18. A network element as claimed in claim 11, wherein the network element is further operative to: estimate an error in the inferred component parameter value; and adjust the inferred component parameter value based on the estimated error.

\* \* \* \* \*